Nov. 24, 1964    P. E. A. LARSSON    3,158,168
PRESSURE-DIVIDER FOR HYDRAULIC CONTROL
Filed Oct. 26, 1962

Inventor
Per Erik A. Larsson
by W. C. Crutcher,
His Attorney

United States Patent Office 3,158,168
Patented Nov. 24, 1964

3,158,168
PRESSURE-DIVIDER FOR HYDRAULIC CONTROL
Per Erik A. Larsson, Schenectady, N.Y., assignor to General Electric Company, a corporation of New York
Filed Oct. 26, 1962, Ser. No. 233,339
7 Claims. (Cl. 137—101)

This invention relates to an improved hydraulic pressure divider for dividing an incoming varying hydraulic pressure control signal into varying hydraulic pressure output signals related in a particular way to the input signal, and which are reinforced so as to be capable of operating pressure-responsive devices without significant transient pressure drop.

Hydraulic pressure dividers, wherein a variable pressure is divided up into proportional parts, find many applications. One such application is found in fuel supply systems for dual-fuel gas turbine power plants, wherein two fuels are supplied to the gas turbine continuously in a selected ratio, regardless of wide variations in the combined rate of supply. One type of pressure-divider may be seen in U.S. Patent 2,637,334 issued to N. E. Starkey on May 5, 1953 which utilizes static pressure bellows and balancing levers to obtain the pressure division. Another type of pressure divider suitable for a dual-fuel gas turbine is disclosed in U.S. Patent 2,933,894 issued to R. M. Johnson and A. Loft on April 26, 1960, wherein pressure-dividing is achieved by interrelated pressure drops through variable orifices. The output signals are also superimposed on a constant pressure signal in that patent. Both of the foregoing patents are assigned to the assignee of the present application.

One disadvantage found in prior art pressure dividers is that where proper operation depends on balanced static pressures, as in the Starkey patent, transient changes causing small flows of hydraulic fluid to or from the pressure-responsive device being controlled will introduce errors in the signals, until steady state conditions are again achieved. One disadvantage found with the other mentioned type of pressure-divider, which depends on pressure drops through variable orifice openings, is the extreme precision with which such devices must be manufactured.

Accordingly, one object of the present invention is to provide an improved hydraulic pressure-divider which divides a variable hydraulic pressure input signal into output signals, which are related in a desired way to the input signal.

Another object of the invention is to provide an improved pressure-divider with reduced tendency to give false signals arising from transient effects.

Still another object of the invention is to provide an improved pressure-divider which does not require extreme precision in manufacture, yet which provides results superior to prior art devices of this type.

A more specific object of the invention is to provide an improved pressure-divider suitable for use in a dual-fuel gas turbine power plant which will split an input control signal consisting of a variable part and a constant part into two variable output signals, each of which consists of the same constant part of the control signal with a portion of the variable part superimposed thereon.

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

Briefly stated, the invention is practiced by providing a pressure-dividing pilot valve to sense an intermediate pressure in the hydraulic input signal, a force-balanced computing piston for obtaining a desired relationship between the incoming hydraulic pressure signals and the outgoing hydraulic pressure signals, and one or more pressure relays for reinforcing the output signals to reduce errors caused by transient flow effects.

Figure 1:
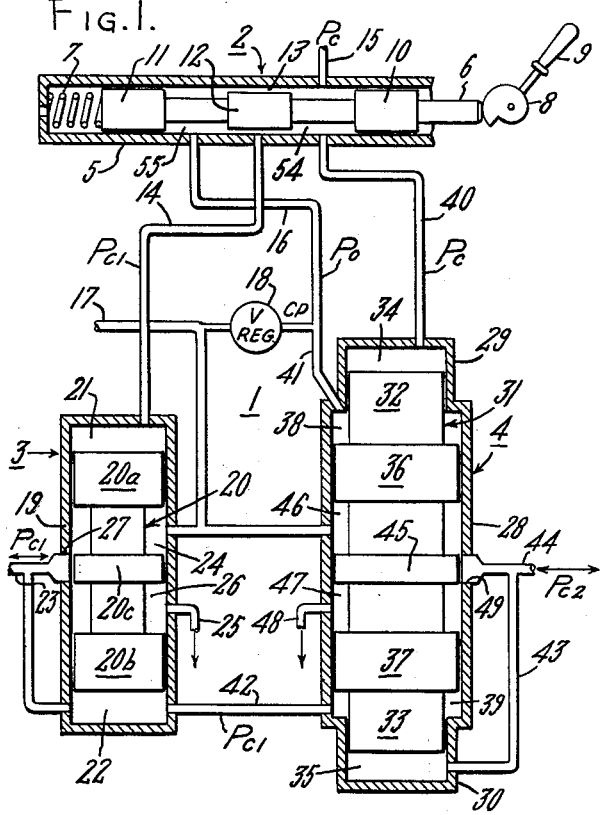
FIG. 1 is a simplified schematic view showing the components of the pressure-divider.

Referring now to FIG. 1 of the drawing, the pressure-divider, shown generally as 1, comprises, in its preferred embodiment, a pressure-dividing pilot valve 2, a pressure relay 3, and a combined pressure relay and hydraulic computer 4.

Pressure-dividing pilot valve 2 includes a sleeve 5 which encloses an adjustable valve stem 6 biased by a spring 7 toward a rotatable cam 8. Suitable means for rotating cam 8, such as an automatic control or a simple manual control indicated by handle 9, allows valve stem 6 to be positioned at any desired place within the sleeve 5. The stem 6 includes end lands 10, 11, forming fairly tight clearances with sleeve 5, perhaps on the order of 0.5–1 mil, and a central pressure-dividing land 12. Land 12 forms a restricted flow passage 13 with sleeve 5, which is exaggerated here for purposes of illustration, and which may be on the order of 1.5-3 mils. Flow passage 13 connects pressure chambers 54, 55 on either side of pressure-dividing land 12. A small pressure-sensing conduit 14 enters sleeve 5 and opens into restricted flow space 13.

Connected to pressure chamber 54 is an input conduit 15, through which is supplied a varying hydraulic pressure input signal, hereinafter referred to as the "control pressure" $P_C$. Control pressure $P_C$ would, in the case of a dual-fuel gas turbine, be a signal reflecting changes in the total fuel demand on the gas turbine, but would have no control over the actual proportioning of the two or more fuels used. The producer of signal $P_C$ typically gives a relatively weak signal or is restricted in that it cannot provide adequate flow capacity. In a gas turbine dual-fuel system, $P_C$ might vary between 40 and 200 p.s.i.g., comes from the fuel regulator, and would normally only have capacity to operate a bellows-type instrument, i.e., a "no-flow" device.

The other input signal supplied to the pilot valve 2 is a supply of fluid at "constant pressure" $P_O$, which is supplied through a conduit 16 to the pressure chamber 55. An oil supply conduit 17 and pressure regulator 18 are connected so as to supply conduit 16 with the constant pressure fluid $P_O$. The oil pressure in supply conduit 17 is higher than the other pressures prevailing in the pressure divider 1 being, for example, on the order of 300 p.s.i.g. Although the supply pressure may fluctuate somewhat, the spring bias in relief valve 18 serves to insure a constant hydraulic pressure $P_O$ in the fluid leaving relief valve 18, perhaps on the order of 40 p.s.i.g.

As will be explained later in detail, the pressure in the pressure-sensing conduit 14 is a function of the pressures $P_C$ and $P_O$ in chambers 54, 55 respectively, and also of the position of pilot valve stem 6, which is adjusted by cam 8. However, this pressure signal has very little capacity to operate pressure-responsive devices of any size and, hence, almost any flow through conduit 14, due to transient pressure changes, will introduce errors.

In order to "reinforce" the pressure signal in conduit 14, i.e., to increase its ability to accommodate transient flows without error, pressure relay 3 is employed. Pressure relay 3 comprises a closed sleeve 19, in which is disposed a relay piston 20. Piston 20 includes an upper piston portion 20a, a lower piston portion 20b, and a control land 20c. Conduit 14 connects with a closed pressure chamber 21, above piston 20a; a similar closed pressure chamber 22 below piston 20b is connected to an output pressure conduit 23. Conduit 23 is connected to one of the pressure-responsive controlled devices (not shown) which is operated by pressure-divider 1. The output signal in conduit 23 is a source of fluid at a varying pressure, hereinafter designated as $P_{C1}$.

In order to provide flow to and from conduit 23, in response to the position of piston 20, fluid from supply conduit 17 is furnished to a chamber 24, above control land 20c; a drain conduit 25 serves to remove fluid from a chamber 26, below control land 20c. A control port 27 in sleeve 19 is connected to conduit 23, so that oil can flow from chamber 24 into conduit 23, when piston member 20 is lowered, and so that oil can discharge from conduit 23 into chamber 26, and out drain pipe 25, when piston member 20 is raised. For equilibrium of piston member 20 to exist, i.e., for it to remain in the position shown, the pressures in chambers 21, 22 must be equal. Slight movements of piston 20, however, due to pressure changes in chamber 21, for example, will provide large flow changes in conduit 23, to accommodate transient signals.

Referring now to the combined pressure relay and hydraulic computing device 4, it will be seen that it serves two functions. First, it produces a predetermined relation between the hydraulic pressure input signals and the hydraulic pressure output signals such that the sum of the input pressures $P_O$ and $P_C$ is equal to the sum of the output pressures, although by minor changes other relationships could also be achieved. Secondly, device 4 also acts as a pressure relay to "reinforce" the resulting pressure output signal in the same manner as device 3.

Device 4 includes a closed cylindrical sleeve 28, having smaller diameter extensions 29, 30 on the upper and lower ends thereof. A piston member 31 is disposed in sleeve 28, and has opposite piston portions 32, 33 disposed in sleeve extensions 29, 30 respectively, to provide expansible pressure chambers 34, 35. Piston member 31 also includes larger diameter piston portions 36, 37, providing expansible pressure chambers 38, 39. The transverse surface areas of piston portions 36, 37, exposed to chambers 38, 39 respectively, and of piston portions 32, 33, exposed to chambers 34, 35 respectively, are all equal to one another. Thus, equal pressures in these chambers will give equal forces on the pistons. In order for the piston member 31 to remain in equilibrium, the downward force produced by the sum of the pressures in chambers 34, 38 must equal the upward force produced by the sum of the pressures in chambers 35, 39.

Chamber 34 in the top of device 4 is connected to the varying control pressure chamber 54 in the pilot valve 2 by a conduit 40. Therefore, the pressure in conduit 40 and chamber 34 will be the same as the control pressure $P_C$.

Chamber 38 in device 4 is connected to the outlet of relief valve 18 by a conduit 41. Therefore, chamber 38 will be supplied with hydraulic fluid at a constant pressure $P_O$.

Pressure chamber 39 is supplied with fluid by a pipe 42 connected to the lower end of pressure relay 3, and communicating with chamber 22. Hence, pressure chamber 39 will be supplied with the reinforced hydraulic signal $P_{C1}$ from device 3.

The remaining pressure chamber 35 is supplied by a pipe 43 connected to an output conduit 44. The pressure in chamber 35 is the resultant of balanced forces holding piston 31 in equilibrium. Conduit 44 is connected to a pressure-responsive controlled device (not shown) and supplies a reinforced hydraulic output signal, hereinafter designated $P_{C2}$.

Device 4 also incorporates a pressure relay arrangement similar to that of device 3. This includes a control land 45 on the piston member 31, to divide the space between piston portions 36, 37 into an oil supply chamber 46 and oil discharge chamber 47. Supply chamber 46 is connected to the oil supply line 17, and the discharge chamber 47 is connected to a discharge pipe 48. Control land 45 cooperates with a control port 49 in sleeve 28, which in turn communicates with pipes 43, 44, thus maintaining the force balance of piston member 35 and having ample flow capacity to satisfy transient flow demands. In this respect, control land 45 in the device 4 operates exactly like control land 20c in device 3.

It will be noted that movement of the piston 31 is primarily caused by the vector sum of the several different pressures (i.e., forces) acting upon it. Movement will admit or discharge fluid from chamber 35 to tend to maintain piston 31 in a position centered about port 49. Since the sum of the pressures in chambers 34, 38, must equal the sum of pressures in chambers 35, 39, then the sum of the hydraulic signals $P_O$ and $P_C$ must necessarily equal the sum of the two signals $P_{C1}$ and $P_{C2}$. In other words, $P_{C2}$ is the resultant of the summation of the two downward forces due to $P_O$ and $P_C$ less the upward force due to pressure $P_{C1}$. However, this relation alone does not determine what portion of the variable signal $P_C$ is allocated to each of the two signals $P_{C1}$ and $P_{C2}$. This allocation is set with the pressure-dividing pilot valve 2 by selecting a proper setting with control lever 9.

Figure 2:
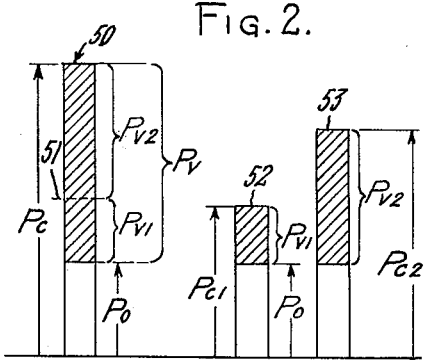
FIG. 2 is a drawing showing the pressure relationships in the hydraulic fluid at various points in the pressure-divider.

Referring to FIGURE 2 of the drawing, a bar graph shows the functions performed by the pressure-divider of FIGURE 1. On the left, the bar 50 shows the inputs to the pressure divider consisting of a varying hydraulic pressure signal $P_C$ and a constant pressure signal $P_O$. The difference between these pressures is the variable pressure $P_V$, which, in turn, is divided into two portions $P_{V1}$ and $P_{V2}$ by the dotted line 51. Inasmuch as the pressure-responsive devices operated by the pressure-divider are preferably designed to function only upon exceeding a certain pressure input, i.e. are biased so that a pressure in excess of $P_O$ is required to operate them, it is desired that the output signals coming from the pressure-divider be also composed of variable pressures superimposed upon the constant pressure $P_O$. Accordingly, the right-hand bars 52, 53, show the variable portions $P_{V1}$ and $P_{V2}$, superimposed upon the constant pressure $P_O$ to provide output signals $P_{C1}$ and $P_{C2}$, respectively. As mentioned previously, it is desired that the proportions of the variable pressure signals $P_V$ which are allocated to the two output signals be adjustable, i.e. that line 51 of bar graph 50 be adjustable. The latter function is performed by the pressure-dividing pilot valve 2.

Figure 3:
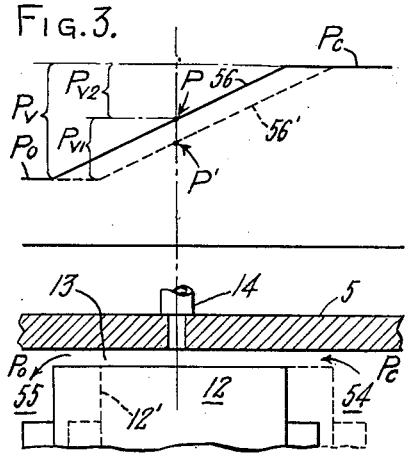
FIGS. 3 and 4 are enlarged views of a portion of the pressure-dividing pilot valve with accompanying graphs illustrating the pressure relationships in the pilot valve.

Referring to FIGURE 3 of the drawing, a portion of the pressure-dividing land 12, inside pilot sleeve 5, restricts the flow through passage 13 from the right-hand chamber 54 at pressure $P_C$ to the left-hand chamber 55 at pressure $P_O$. The pressure variation in passage 13 along the length of land 12, is very nearly linear with respect to distance along the land from chamber 54. Hence, the conduit 14, communicating with space 13, senses the intermediate pressure at a particular point along space 13. The accompanying graph of FIGURE 3 shows pressure on the vertical axis plotted against the distance along the pilot valve on the horizontal axis. The portion 56, of the graph indicates the drop in pressure from $P_C$ to $P_O$ through passage 13, the pressure difference being $P_V$. Conduit 14 senses the pressure in passage 13 indicated by point P on the graph. Hence point P divides the variable portion $P_V$ of the control signal into portions $P_{V1}$ and $P_{V2}$.

Movement of the pilot valve to the right or left changes the proportions of $P_V$ which is allocated to the two output control signals $P_{C1}$ and $P_{C2}$. For example, in FIGURE 3, if land 12 is moved to the right as shown by the dotted lines 12', the corresponding change on the accompanying graph is indicated by line 56'. The new intermediate pressure sensed by conduit 14 is now indicated at point P' and it will be observed that the variable portion $P_{V1}$ is smaller while variable portion $P_{V2}$ is larger, their sum still being $P_V$.

In addition to providing means for allocating proportions of the variable portion $P_V$ to the two output signals by moving pilot valve stem 6, the pressure-divider is also responsive to changes in the total variable control pressure $P_C$, without changing the relative proportions of $P_V$ allocated to the output signals, once they have been established by positioning handle 9. This may be seen by reference to FIGURE 4, which shows the same elements as in FIGURE 3. In this case, however, the variable control pressure $P_C$ has changed (lowered) to $P_C'$. The sloping portion 57, of the graph has likewise changed to the position indicated at 57'. Hence the variable portion $P_V$ has been reduced to $P_V'$. It will be observed, however, that the intermediate pressure sensed by conduit 14, at point P has been proportionately reduced to a new intermediate pressure at P'. Therefore, there is no change in allocation of portions of the variable part $P_V$, even though its total value has changed.

In operation, the variable control input signal $P_C$ is caused to change so as to demand changes in total output signal from the pressure-divider. In a dual-fuel gas turbine, for example, $P_C$ would represent total fuel demand. The pressure-dividing pilot valve 2, cooperating with the force-balanced piston member 31, produces output signals $P_{C1}$ and $P_{C2}$, each of which comprises a portion of the difference between $P_C$ and $P_O$ superimposed upon the constant pressure $P_O$ (see FIG. 2). Signals $P_{C1}$ and $P_{C2}$ serve to operate suitable pressure-responsive devices. In the case of a dual-fuel gas turbine, these would be pressure-responsive fuel valves for controlling the supply of two different fuels. The proportions of the two fuels supplied, irrespective of the total fuel called for, is varied by merely moving handle 9 to adjust the position of the pilot valve stem 6.

The incorporation of the pressure relay 3 and the corresponding pressure relay arrangement in device 4, serves to reinforce the otherwise weak signals obtainable from the producer of signal $P_C$. Since the actual fluid for the pressure output signals $P_{C1}$ and $P_{C2}$ is derived from the relatively high pressure oil supply line 17, strong signals with ample compensation for transient effects are provided.

By way of numerical example, assume that the constant pressure signal $P_O$ equals 40 p.s.i.g., the variable control signal $P_C$ is 100 p.s.i.g., and the handle 9, is set so that land 12 is centered on conduit 14, i.e. $P_{V1}=P_{V2}$. Then the output pressures $P_{C1}$ and $P_{C2}$ must each equal 70 p.s.i.g. (40+100=70+70) in order for piston 31 to remain in equilibrium.

Figure 4:
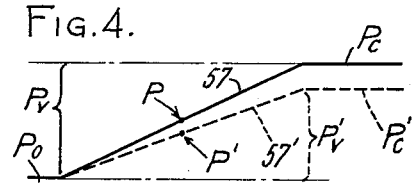
Figure 4:
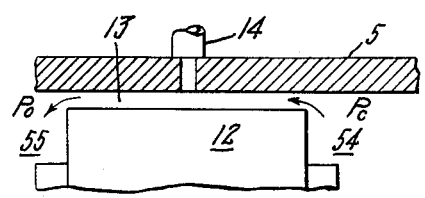

Suppose now that the variable input signal $P_C$ drops to 80 p.s.i.g. (FIG. 4). Then $P_{C1}$ and $P_{C2}$, must each equal 60 p.s.i.g. (40+80=60+60). Thus the proportions between $P_{C1}$ and $P_{C2}$ are not changed by variations in the variable signal pressure $P_C$.

Suppose now, with the previous original conditions ($P_O$=40 and $P_C$=100), pilot valve land 12 is moved to the right so that $P_{C1}$ is reduced from 70 to 60 (FIG. 3). Relay piston 20 will move upward momentarily to partially uncover port 27 so as to discharge some fluid into chamber 26, and it will then recenter to cover port 27 as soon as the pressure in chamber 22 again equals that in chamber 21.

The reduced pressure in chamber 22 is communicated to chamber 39 and piston member 31 will move downward momentarily to partially uncover port 49, whereupon fluid is supplied from chamber 46 through port 49 and pipe 43 to chamber 35. This increases the pressure in chamber 35 to recenter piston 31 and cover port 49. In order for piston 31 to rebalance, the pressure $P_{C2}$ in chamber 35 must rise to 80 p.s.i.g. Thus the difference between $P_C$ and $P_O$ is reallocated to the output signals, without changing the sum of the output signals (40+100=60+80).

Although it is usually preferred to operate the pressure-responsive devices above the constant pressure bias $P_O$, it is also within the purview of the invention to simply divide the pressure $P_C$ into two output signals $P_{C1}$ and $P_{C2}$ which are not superimposed upon another hydraulic signal. In other words, the pressure $P_O$ would be equal to zero gage pressure or atmospheric pressure. In this case conduits 16, 41 and relief valve 18 are simply eliminated. Thus the chambers 55 and 38 are exposed to constant atmospheric pressure. The device then operates exactly the same except that $P_O$ is constant at "zero" gage pressure.

It will be observed that small movements of the relay pistons 20 and 36 allow large flow variations in conduits 23, 44, supplying the output signals $P_{C1}$ and $P_{C2}$ without any erroneous effect on the pressure signal, because the operating fluid is supplied by the main oil supply line 17. Hence, the relatively weak signal pressures entering devices 3, 4, are reinforced and relayed by a source of hydraulic supply fluid, which has a much greater capacity to reduce errors in the signals supplied to the pressure-responsive devices operated by the improved pressure-divider.

An important advantage of the invention is that the components of my improved pressure-divider need not be manufactured with extreme precision, involving a time consuming "cut-and-try" method, as in the case of previous pressure-dividers, and will give satisfactory results using normal manufacturing tolerances.

While there has been described what is at present considered to be the preferred embodiment of the invention, other modifications may occur to those skilled in the art and it is desired to cover in the appended claims all such modifications as fall within the true spirit and scope of the invention.

What I claim as new and desire to secure by Letters Patent of the United States is:

1. A pressure divider comprising:
   pilot valve means providing a hydraulic pressure selectively intermediate that of a first varying hydraulic control pressure signal and a second hydraulic constant pressure signal,
   first pressure relay means for reinforcing said intermediate pressure to provide a third hydraulic pressure signal,
   hydraulic computing means for providing a forth hydraulic pressure signal whose value is equal to the sum of the first and second signals minus the third signal, and,
   second pressure relay means for reinforcing said fourth pressure signal to amplify its flow capacity to accommodate transient flow response.

2. A pressure divider comprising:
   a pressure-dividing pilot valve defining a first chamber connected to a variable pressure source and defining a second chamber at a substantially constant pressure, said pilot valve also defining a restricted flow passage connecting the first and second chambers,
   a pressure-sensing conduit communicating with an intermediate portion of said restricted flow passage to sense the intermediate hydraulic pressure therein,
   means for selectively changing the relative positions of the pressure-sensing conduit and the restricted flow passage,
   hydraulic computing means for providing a resultant hydraulic pressure signal equal to the sum of the pressures in the first and second chambers less said intermediate pressure, and
   first and second pressure relaying means for reinforcing said intermediate pressure and said resultant pressure signals to amplify their flow capacities to accommodate transient flow response.

3. A pressure divider comprising:
   pilot valve means for producing a hydraulic pressure selectively intermediate that of a first varying control pressure and a second constant pressure, first pressure relay means for reinforcing said intermediate pressure to provide a third hydraulic output signal having a pressure equal to said intermediate pressure, hydraulic computing means comprising a cylinder including a force-balanced piston therein, said piston and cylinder defining first and second pressure chambers on one end thereof and third and fourth opposing pressure chambers on the other end thereof, means supplying fluid at said first, second, and third pressures to said first, second, and third pressure chambers respectively, second pressure relay means including valve means actuated by the movement of said piston providing a reinforced fourth hydraulic output signal equal to the sum of the first and second pressures minus the third pressure.

4. A pressure-divider comprising:

a pressure-dividing pilot valve defining first and second pressure chambers connected by a restricted flow passage, a first pressure-sensing conduit opening into said restricted flow passage at a point intermediate the ends thereof, means for selectively changing the point of communication of the first conduit with the restricted flow passage, said first pilot valve chamber containing hydraulic fluid under a variable pressure, said second pilot valve chamber containing hydraulic fluid under a substantially constant pressure, whereby said pressure-sensing conduit senses a pressure intermediate that of the first and second chambers, a source of hydraulic supply fluid under a relatively high pressure, first pressure relay means for reinforcing said intermediate pressure to provide a first output pressure signal, said first pressure relay including first valve means controlling admission of fluid from said supply fluid source to amplify its flow capacity to accommodate transient changes in flow brought about by pressure changes in the first conduit, a hydraulic computing device comprising a cylinder including a force-balanced piston disposed therein, said piston and cylinder defining third and fourth pressure chambers on one end thereof and fifth and sixth opposing pressure chambers on the other end thereof, second conduit means connecting the first pilot valve chamber to the third pressure chamber, third conduit means connecting the second pilot valve chamber to the fourth pressure chamber, fourth conduit means connecting said first pressure relay means to supply said reinforced intermediate pressure signal to said fifth pressure chamber, fifth conduit means connected to said sixth pressure chamber, and second pressure relay means including second valve means operated by said piston and controlling admission of fluid from said supply fluid source to the fifth conduit means to provide a second pressure output signal which is reinforced to amplify its flow capacity to accommodate transient changes in flow.

5. A pressure-divider comprising:

a pilot valve comprising a sleeve and including a slidable stem disposed therein with means for selectively positioning said stem within the sleeve, said stem having a pressure-dividing land disposed thereon defining a restricted flow passage with said sleeve, said stem and sleeve also defining first and second pressure chambers on either side of said land, said first pilot valve chamber containing hydraulic fluid under a varying control pressure $P_C$, said second pilot valve chamber containing hydraulic fluid under a substantially constant pressure $P_O$, a pressure-sensing conduit communicating with the restricted flow passage at a location intermediate to the ends thereof, whereby selected positioning of the stem will provide an intermediate varying pressure $P_{C1}$ which is a selected proportion of the difference between pressures $P_C$ and $P_O$, first pressure relay means comprising a first closed sleeve including a first piston member disposed therein, said sleeve and piston member defining third and fourth pressure chambers on opposite ends thereof, said pressure-sensing conduit being connected to communicate pressure $P_{C1}$ to said third pressure chamber, a source of supply fluid under pressure, first valve means controlled by the movement of the first pressure relay piston and connected to control the admission of fluid from said supply source to the fourth pressure chamber, whereby said piston is balanced when the pressure in the fourth chamber equals the pressure $P_{C1}$ in the third chamber, combination pressure relay means and hydraulic computing means comprising a second closed sleeve including a second piston therein, said sleeve and second piston together defining fifth and sixth pressure chambers at one end thereof and seventh and eighth opposed pressure chambers at the other end therein, first conduit means connecting said first chamber to communicate pressure $P_C$ to said fifth chamber, second conduit means connecting said second chamber to communicate constant pressure $P_O$ to said sixth chamber, third conduit means connecting said fourth chamber to communicate pressure $P_{C1}$ to said seventh chamber, said eighth pressure chamber having fluid therein at pressure $P_{C2}$, second valve means controlled by the movement of the second piston and connected to control the admission of fluid from the source of supply fluid to the eighth pressure chamber, the areas of the second piston exposed to the fifth, sixth, seventh and eighth chambers respectively being equal, whereby $P_O$ plus $P_C$ equals $P_{C1}$ plus $P_{C2}$, whereby conduit means communicating with the fourth and eighth chambers respectively will furnish reinforced hydraulic output signals $P_{C1}$ and $P_{C2}$.

6. A pressure divider comprising:

a pressure-dividing pilot valve defining a first chamber connected to a first variable control pressure source and defining a second chamber at a substantially constant pressure, said pilot valve also defining a restricted flow passage connecting said first and second chambers providing a gradual substantially linear pressure drop therebetween, a first pressure-sensing conduit communicating with said restricted flow passage to sense an intermediate hydraulic pressure therein, means for selectively setting the relative positions of the first conduit and restricted flow passage, a source of hydraulic supply fluid under a pressure greater than the variable control pressure in said first pilot valve chamber, and, pressure relay means for reproducing and reinforcing the intermediate hydraulic pressure sensed by said first conduit including valve means actuated by a force-balanced piston and controlling admission of said source of supply fluid to amplify the flow capacity of the intermediate hydraulic pressure sensed in the first conduit to accommodate changes in flow.

7. A combination pressure relay and hydraulic computing servo-device comprising:

a cylinder having a force-balanced piston therein, said cylinder and piston defining first and second pressure chambers on one end thereof and third and fourth opposing pressure chambers on the other end thereof, said first chamber containing hydraulic fluid at a varying control pressure, said second chamber containing hydraulic fluid at a substantially constant pressure,
said third chamber containing hydraulic fluid at a third varying pressure intermediate that of the first and second chambers, and
value means actuated by the piston to control the admission of fluid from a pressurized supply source to the fourth chamber,
said piston having equal areas exposed to the first, second, third and fourth chambers, whereby the sum of pressures in the first and second chambers will be equal to the sum of pressures in the third and fourth chambers.

References Cited by the Examiner

UNITED STATES PATENTS

| | | | |
|---|---|---|---|
| 2,637,334 | 5/53 | Starkey | 137—85 |
| 2,690,167 | 9/54 | Moulton. | |
| 2,774,367 | 12/56 | Grogan | 137—86 |
| 2,884,758 | 5/59 | Oberle | 60—39.28 X |
| 2,933,894 | 4/60 | Johnson | 137—612.21 X |
| 2,977,968 | 4/61 | Stiglic | 137—86 |
| 3,016,064 | 1/62 | Royle | 137—86 X |

ISADOR WEIL, *Primary Examiner.*

CLARENCE R. GORDON, *Examiner.*